(12) United States Patent
Hawkins

(10) Patent No.: US 6,899,053 B2
(45) Date of Patent: May 31, 2005

(54) FLAG CLAMPING DEVICE FOR AUTOMOBILE ANTENNA

(76) Inventor: Mark W Hawkins, 2626 Medlin Rd., Monroe, NC (US) 28112

( * ) Notice: Subject to any disclaimer, the term of this patent is extended or adjusted under 35 U.S.C. 154(b) by 50 days.

(21) Appl. No.: 10/197,137

(22) Filed: Jul. 17, 2002

(65) Prior Publication Data

US 2003/0000044 A1 Jan. 2, 2003

Related U.S. Application Data

(63) Continuation-in-part of application No. 29/132,238, filed on Nov. 6, 2000, now Pat. No. Des. 448,702.

(51) Int. Cl.[7] .............................................. G09F 17/00
(52) U.S. Cl. ..................... 116/173; 116/28 R; 403/282; 403/283
(58) Field of Search ............................... 166/20 R, 173, 166/174; 403/283, 279, 282, 317, 316, 344

(56) References Cited

U.S. PATENT DOCUMENTS

| 410,221 A | * | 9/1889 | Thompson | 116/173 |
| 1,036,168 A | * | 8/1912 | Updike | 116/173 |
| 1,631,566 A | * | 6/1927 | Walton | 116/173 |
| 2,906,234 A | * | 9/1959 | Scott | 116/173 |
| 3,127,869 A | * | 4/1964 | Howland | 116/173 |
| 3,217,690 A | * | 11/1965 | Mihalisin | 116/173 |
| 3,636,912 A | * | 1/1972 | Kamp | 116/28 R |
| 3,729,780 A | * | 5/1973 | White | 24/704.2 |
| 4,059,300 A | * | 11/1977 | Moberg et al. | 292/322 |
| 4,441,233 A | * | 4/1984 | Swift | 24/16 PB |
| 4,534,089 A | * | 8/1985 | Swan | 24/559 |
| 5,039,048 A | * | 8/1991 | Paxton | 248/229.24 |
| 5,732,927 A | * | 3/1998 | Purpura | 248/539 |
| 5,881,481 A | * | 3/1999 | Bashaw, Jr. et al. | 40/593 |
| 6,192,824 B1 | * | 2/2001 | Chang | 116/173 |

* cited by examiner

Primary Examiner—Christopher W. Fulton
Assistant Examiner—Tania Courson
(74) Attorney, Agent, or Firm—Jason S. Miller

(57) ABSTRACT

The present invention is directed to a garment clamping device for automobile antennas upon which a flag or banner may be secured and displayed. The clamping device comprises two generally rectangular shaped halves which are joined together by a hinge strap mechanism. Each half has at least one aperture and at least one corresponding mounting stud for clamping the two halves around an automobile antenna. Further, each half has at least one barb and at least one corresponding aperture located on the other half for holding and supporting a display flag after the apparatus is clamped around the antenna. Extending from one half is a cap for securing the apparatus atop the antenna. In operation, the device is positioned around an antenna and the mounting stud, barbs and respective apertures are engaged. Once engaged, the hinge straps form a cavity wherein the antenna is displaced. The cap of the device is positioned so that it rests upon the antenna ball located atop the antenna thereby keeping the clamp in a visibly appealing position. In certain embodiments, additional support is provided by a tape strip or other adhesive. In certain other embodiments, an attachment means for attaching the device to a bicycle or motor bike is provided. The attachment means comprises an elongated shaft and a second clamping device.

14 Claims, 5 Drawing Sheets

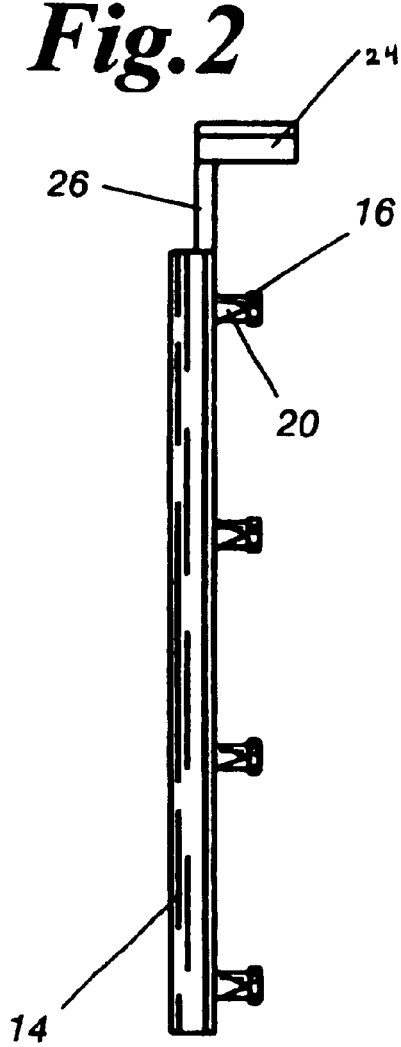
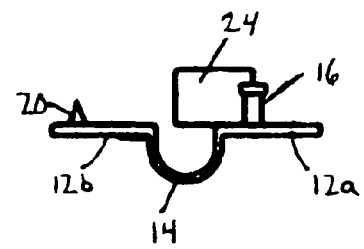
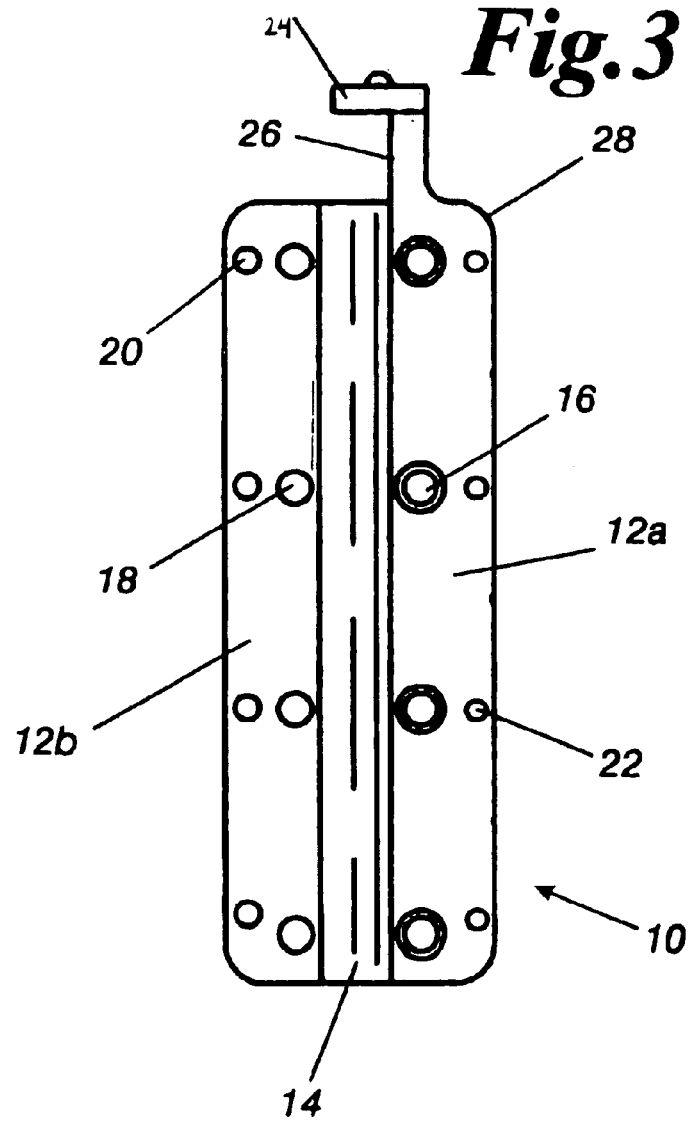

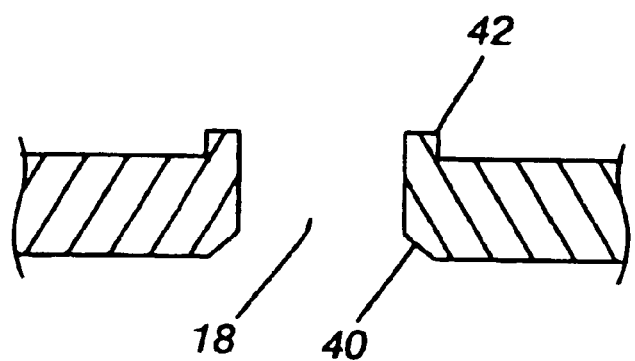
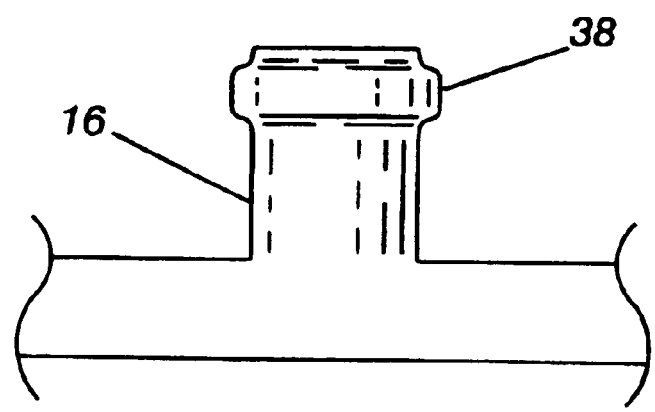
Fig.5
Fig.6

FLAG CLAMPING DEVICE FOR AUTOMOBILE ANTENNA

CROSS REFERENCE TO RELATED APPLICATION

This is a Continuation-In-Part Application of U.S. patent application Ser. No. 29/132,238 filed Nov. 6, 2000 now U.S. Pat. No. D448,702.

FIELD OF THE INVENTION

The present invention relates to an apparatus for supporting flags and banners on automobile antennas, and more particularly pertains to an apparatus which supports and removably displays flags or banners at the top of automobile antennas.

BACKGROUND OF THE INVENTION

Often it is desirable for an individual to display a symbol or word(s) from an automobile. These displays take many forms and are used for many purposes, including but not limited too advertising athletic teams, professional organizations, political groups, etc. Some individuals place bumper stickers on their automobiles, others place flags or banners on their car and some prefer to place signs on the sides or hood of the car. Each of the currently known methods and devices have certain disadvantages. By way of example, bumper stickers and signs can damage the surface of the car, thus reducing its resale value. Moreover, bumper stickers are typically low and poorly located. Thus, the desired display is not effective.

By way of another example, most flags or banners are difficult to attach to a car without interfering with the operation of the same. The present art relating to the use of flags on automobiles focuses on three types of attachment systems. First, the use of an attachment system which affixes the flag to a window on the car is employed by most people. This system has several drawbacks. One such drawback is that the device requires the window to remain in the raised position. Another drawback is that the device usually must be wedged between the window and the door frame or jamb. This prevents the door or window from being tightly closed. Thus, in the case of rain, water may seep into the vehicle. Still another drawback is that the presence of the flag in the window creates a blind spot resulting in a hazardous condition during operation.

Another type of attachment system is one which attaches a flag to a bumper or hood of an automobile. These systems are typically permanent and, in the case of removable systems, the flag may slide or move from its original position on the automobile.

Finally, an attachment system whereby a flag is affixed to a car antenna may be used. With respect these types of attachment system, the prior art generally teaches of three types. The first type uses cuts of a plastic extruded material which uses kinetic energy to form a recurve in the plastic which grips around an antenna. This recurve material would have a small flag stapled through the plastic. Because of the enlarged graduation of the older telescoping antennas the extrusion recurve would not allow the flag to slide down the antenna. However, the invention and major usage of the single non-telescoping antenna causes this item to fail after continued usage by allowing it to fall to the bottom of the antenna. Moreover, continued usage of this system causes wear on the inside of the recurve and the staples holding the flag in place which leads to failure of the device.

A second type of system is the cloth sewn style. In this system, a long sock like configuration is sewn together with the flag at the end. The sock portion of the flag is pulled down over the antenna leaving the flag at the top of the antenna. The sock portion generally traverses the entire length of the antenna. A disadvantage of this system is that the device is not aesthetically pleasing to the eye. Moreover, nothing is provided to prevent the device from sliding off the antenna as the automobile gains speed. The majority of these types of systems can only practically be used for promotional car sales on vehicles which are stationary and not in the operational mode.

A third type of system comprises Velcro® strips which have flags sewn thereon. The antenna of the automobile and the flag is sandwiched between the opposing hook and yarn strips of the Velcro® to hold the flag in place. A disadvantage of this type of system is that the flag material frays and becomes entangled in the Velcro®, thereby causing an unsightly ball of cloth with extreme wind resistance.

While the above described known devices may fulfill their respective, particular objectives and requirements, the aforementioned references do not describe an apparatus for supporting and removably displaying flags on automobile antennas which will maintain its position on the antenna while providing the capability of 360° rotation. Therefore, it can be appreciated by those skilled in the art that there exists a continuing need for new and improved apparatus for supporting flags on automobile antennas which can be used for removably positioning flags on antennas of automobiles. Further, it can be appreciated that a need exists which also provides the capability of 360° rotation of the displayed flag above the antenna as directed by the wind. In this regard, the apparatus for supporting flags on automobile antennas according to the present invention substantially departs from the conventional concepts and designs of the prior art, and in doing so provides an apparatus primarily developed for the purpose of removably positioning flags on antennas of automobiles which have a greater life cycle and which provide the capability of 360° rotation while maintaining its position on the top of the antenna.

SUMMARY OF THE INVENTION

Generally, the present invention is directed to a garment clamping device (hereinafter referred to as "antenna clamp") which is used with automobile antennas. The antenna clamp is used to display a flag or banner from the top of the antenna. The clamp is configured so that the flag is always displayed at the top portion of the antenna, thus providing maximum visibility. The antenna clamp generally comprises two generally elongated rectangular-shaped substantially identical halves which may or may not be joined together in a closed position around the antenna. In a preferred embodiment, the antenna clamp is provided with a connection means wherein a first half of the antenna clamp is provided with at least one projecting stud and the second half is provided with a corresponding mating aperture adapted for snap engagement with the stud. Moreover, the antenna clamp is provided with a garment securing means wherein a second half of the antenna clamp is provided with at least one barb and the first half is provided with a corresponding aperture for receiving the barb. The barbs of the antenna clamp are used to secure a flag or banner in place while the clamp is in the closed position. The studs and corresponding apertures are used to maintain the clamp in a snap together closed position.

Intermediate and connecting the halves is a flexible hinge strap mechanism. The hinge mechanism is configured to allow manipulation of the clamp into a closed position thereby forming a generally circular cavity.

In addition, a small cap is provided which projects from the top of the antenna clamp in order to keep the clamp from sliding down the antenna. In operation, a flag material is placed on the barbs, the antenna is positioned into the recurve of the hinge, the clamp is closed around an antenna and secured into position. In the closed position, the cavity diameter of the hinge strap is dimensioned to be larger than the diameter of the antenna so as to encircle the antenna while allowing 360° of rotation of the clamp as so directed by the wind. Further, the cavity diameter is dimensioned to be smaller than the diameter of an antenna ball or knob located at the distal end of the antenna, thereby preventing the clamp from sliding off the top of the antenna.

OBJECTS OF THE INVENTION

The principal object of the present invention is to provide an improved apparatus for supporting a flag or banner on the antenna of an automobile or other transportation vehicle.

A further object of the present invention is to provide an improved apparatus for supporting a flag or banner on the antenna of an automobile or other transportation vehicle which does not introduce safety hazards and which prominently displays the flag in a high visible position when the automobile is parked or driven.

A still further object of this invention is to provide an improved apparatus for supporting a flag or banner on the antenna of an automobile or other transportation vehicle which is easily removed and replaced.

A still further object of the present invention is to provide an improved apparatus for supporting a flag or banner on an antenna which maintains its position at the top of the antenna while providing rotational capabilities about the antenna.

These together with other objects of the invention, along with various features of novelty which characterize the invention, are pointed out with particularity in the claims annexed to and forming a part of the disclosure. For better understanding of the invention, its operating advantages and the specific objects attained by its uses, reference should be had to the accompanying drawings and descriptive matter which there is illustrated preferred embodiments of this invention.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings in which:

FIG. 2 is a side view of the invented antenna clamp shown in FIG. 1.

FIG. 3 is a front view of the invented antenna clamp shown in FIG. 1.

FIG. 4 is a top view of the invented antenna clamp shown in FIG. 1.

FIG. 5 is a fragmentary view illustrating the connection means in the open position of the invented antenna clamp shown in FIG. 1.

FIG. 6 is a fragmentary view illustrating the connection means in the closed position of the invented antenna clamp shown in FIG. 1.

Figure 1:
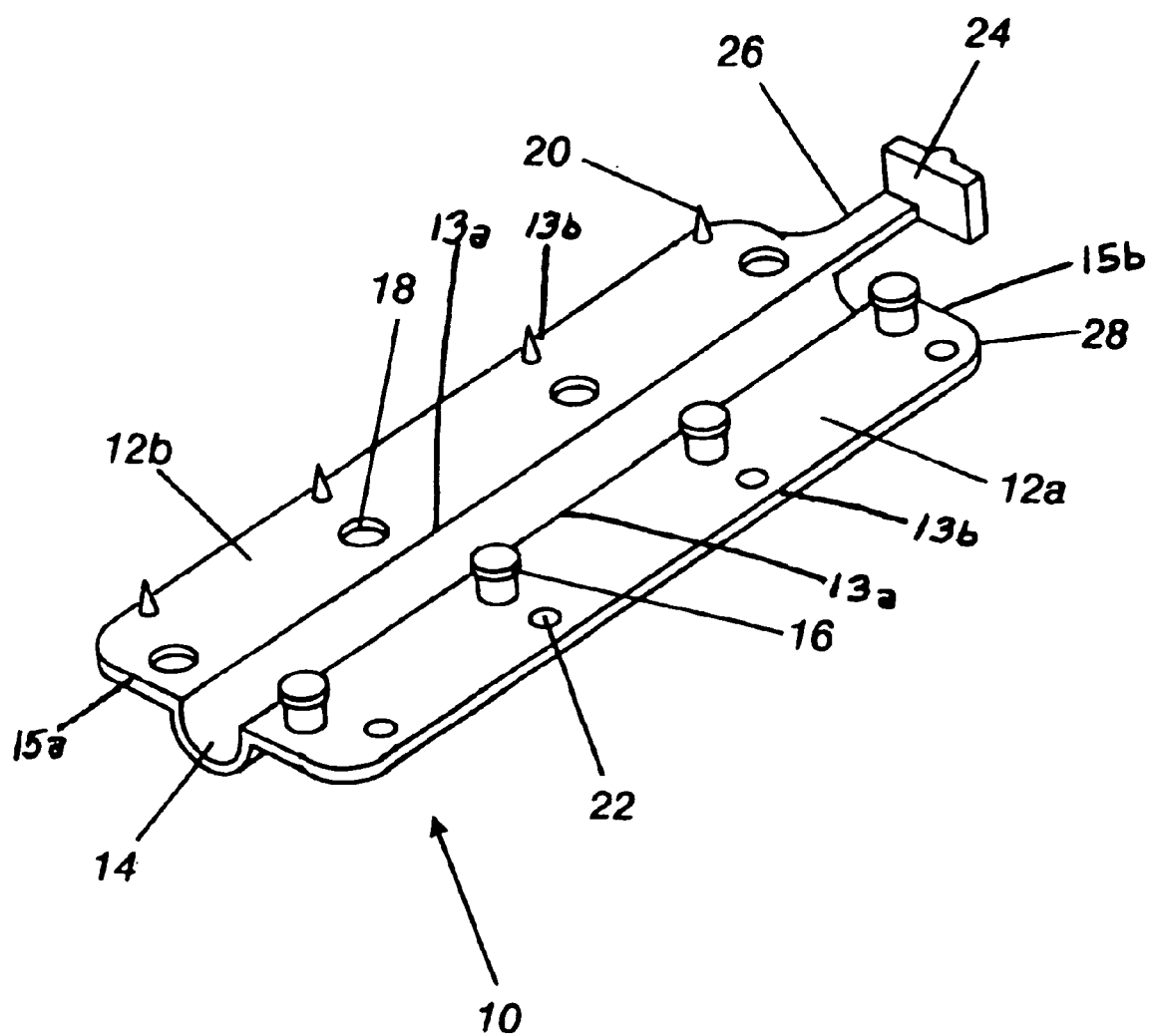
FIG. 1 is a perspective view of a preferred embodiment of the antenna clamp.

It is to be understood that the drawings are merely illustrative of the invention and are not meant to limit the claims. Various modifications and additions may be made to the apparatus by those skilled in the art, without departing from the spirit and scope of this invention, which is therefore understood to be limited only by the scope of the appended claims. Further, the same reference numerals refer to the same parts throughout the various Figures.

DETAILED DESCRIPTION

As required, detailed embodiments of the present invention are disclosed herein. However, it is to be understood by one of ordinary skill in the art that the present discussion is a description of exemplary embodiments only and is not intended as limiting the broader aspects of the present invention, which broader aspects are embodied in the exemplary construction.

The present invention is preferably unitary in construction and is useful with any plastic or other elastomeric material or any combination thereof. By unitary, it is meant that the present invention is formed as one continuous apparatus as opposed to separate parts which are joined to form one apparatus. Suitable plastics are recycled plastics, injection molded plastics, reinforced plastics or the like generally comprised of polyethylene, polypropylene, and polyvinylchloride. Further, the described configuration can be in different sizes and shapes to correspond to different designs and characteristics of automobile antennas, flags and other tubular members.

In view of the foregoing disadvantages inherent in the known types of devices for supporting flags or antennas now present in the prior art, the present invention provides an improved apparatus for supporting flags on-automobile antennas. As such, the general purpose of the present invention, which will be described subsequently in greater detail, is to provide a new and improved apparatus for supporting flags on automobile antennas which has all the advantages of the prior art and none of the disadvantages.

Referring now to the drawings, a preferred embodiment of the present invention is shown in FIGS. 1–7. In FIGS. 1–7, the shown antenna flag clamp 10 is generally comprised of a first half 12a and a second half 12b. The two halves 12a, 12b are substantially similar in configuration and generally comprise an elongate rectangular member having opposing inner and outer sides 13a, 13b, respectively. Each half also has opposing first and second ends, 15a, 15b, respectively. The sides 13a, 13b of the halves 12a, 12b are dimensioned so as to have a greater length than the ends 15a, 15b. The inner sides 13a of the halves 12a, 12b are joined together by a hinge strap mechanism 14 displaced intermediate therein. The outer sides 13b of the respective halves 12a, 12b have rounded edges 28 located at the corners. By using the hinge strap 14, preferably integrally formed with the halves 12a, 12b, the halves 12a, 12b will always be aligned for proper connection as explained herein. Preferably, the disclosed antenna clamp 10 is approximately 4.5" long and 1.7" wide in construction. Further, the halves 12a, 12b of the clamp 10 preferably measure 0.5 inches in width, 6 inches in length, and 0.05 inches in thickness. The connecting hinge 14 is most effective with a thickness of approximately 0.02" for these dimensions.

A connection means is provided for connecting the halves 12a, 12b together and maintaining them in the closed position. The connection means generally has at least one cylindrically shaped projecting member, or stud 16, mounted on the first half 12a of the antenna clamp 10. A corresponding and mating first aperture 18 is located in the second half 12b for snap engagement thereto. As can be seen in FIGS. 5 and 6, the stud 16 is optionally provided with a snap ring 38 located substantially at the outward projecting end for snap engagement with the corresponding first aperture 18. Also, the corresponding aperture 18 is configured so that its receiving side 40 is tapered to permit slideable engagement with the stud 16. Finally, the exit side of the aperture 18 is optionally provided with a snap rim 42.

Figure 8:
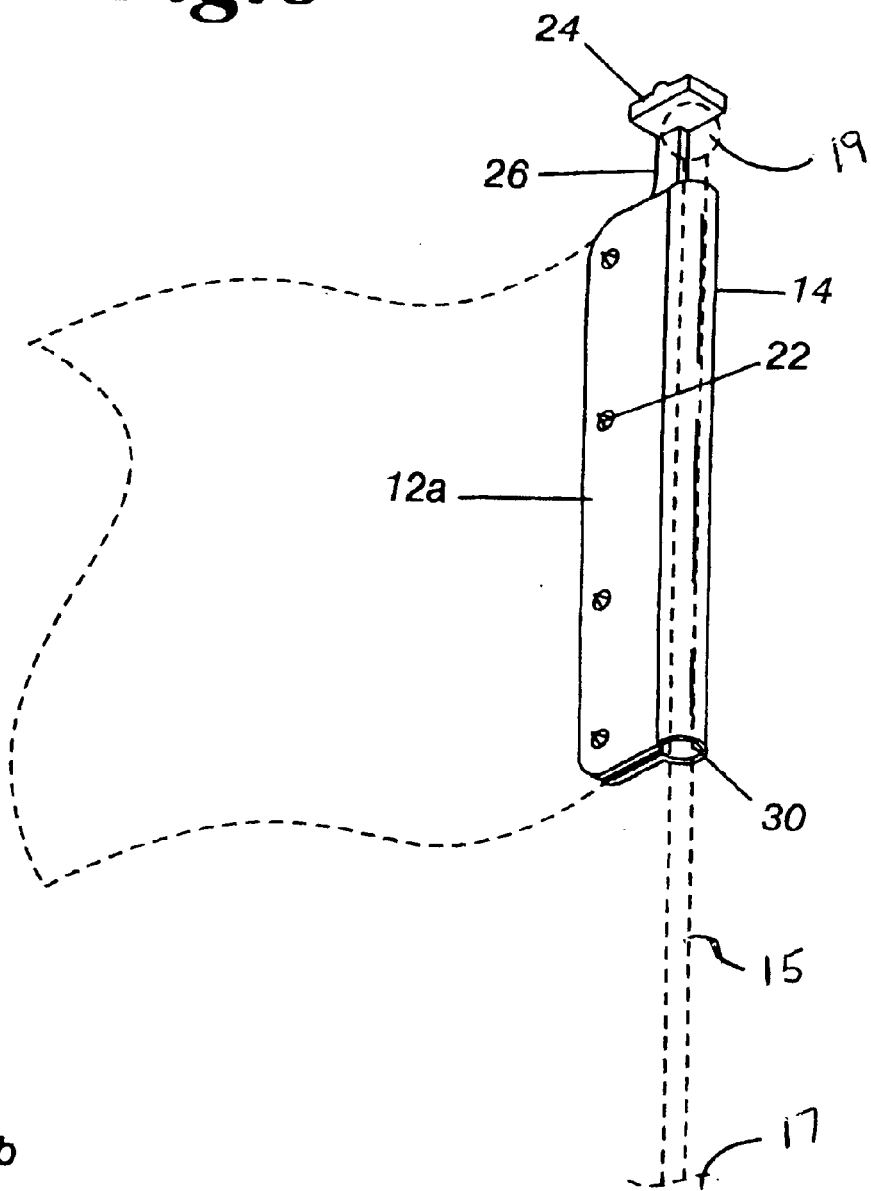
FIG. 8 is a perspective view of the invented antenna clamp shown in FIG. 1 in the closed position around an automobile antenna.
Figure 7:
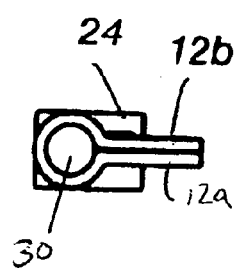
FIG. 7 is a top view of the invented antenna clamp shown in FIG. 1 in the closed position.
Figure 9:
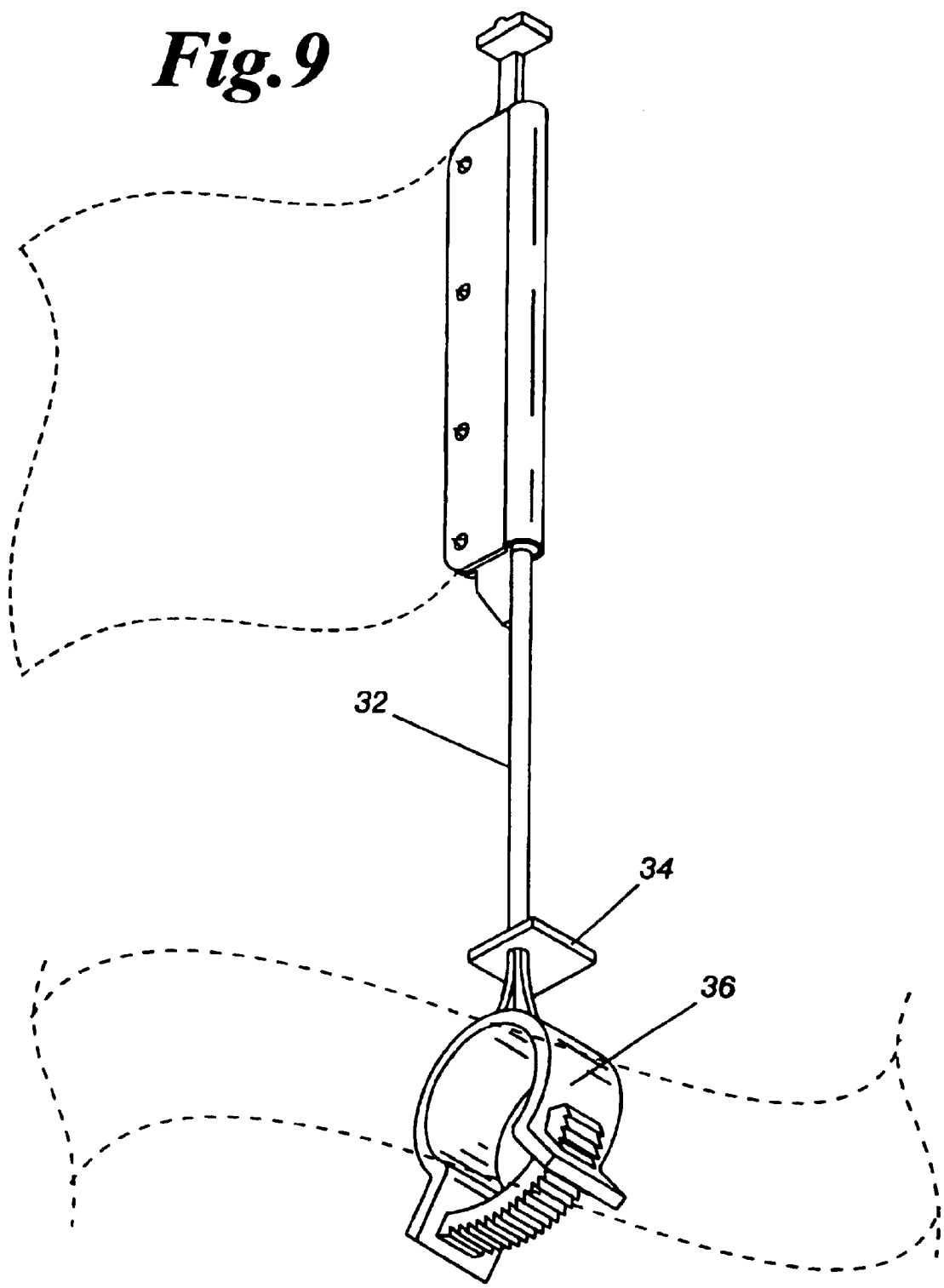
FIG. 9 is a perspecitve view of an alternative embodiment of the present invention in the closed position.

In operation, the first half 12a is manipulated so that the stud 16 is aligned and matingly engaged with the aperture 18 for a secure fit, thereby keeping the device in a closed position (See, FIGS. 7–8). The optional snap ring 38 and snap rim 42 add extra security to the clamp 10 when it is in the closed position as the snap ring 38 overlaps the snap rim 42 after the clamp 10 has been manipulated into the closed position. The use of the above connection means provides the ability to close and open the clamp 10 as described without affecting the structural integrity of the clamp 10. It will be appreciated by those skilled in the art, that the cylindrically shaped studs 16 can take on various other shapes and configurations, provided they will mate with an aperture of like configuration in a male/female connecting relationship. Moreover, it will be appreciated that the projecting stud 16 can be on the second half 12b with the aperture 18 located on the opposing half.

The hinge strap mechanism 14 used in the present invention is sometimes known as a living hinge. The hinge strap 14 is flexible in construction and connects the two halves 12a, 12b. When the apparatus is positioned closed a cavity 30 is defined whereby an automobile antenna can be placed therein. The diameter of the cavity 30 is configured so that an antenna ball, located at the top of the antenna cannot pass therethrough. Further, it is configured so that the antenna clamp 10 may freely rotate about the antenna shaft as so directed by the wind or other force. Once the apparatus is in the closed position, the antenna clamp 10 can readily rotated about the antenna in response to the movement of the air flow. Rotation can be in either the clockwise or counter-clockwise direction up to 360°.

Also provided, is a garment securing means generally comprised of at least one barb 20 located on the second half 12b with a corresponding second aperture 22 located on the opposing half 12a. The barbs 20 are used to securely retain a flag or garment material which is placed thereon. Upon snapping the antenna clamp 10 together the barbs 20 and second aperture 22 are perfectly aligned so that the barbs 20 are centered in the second aperture 22 of each opposing half and barely protrude through the opposing half.

There is an arm extension 26 protruding from the top of the second half 12b of the antenna clamp 10. This extension 26 has affixed to it a small cap 24 which is flat on the underside. The cap 24 is designed to rest atop the antenna ball while the remainder of the clamp 10 is rotatably attached below the antenna ball. This configuration both prevents the clamp from inadvertently sliding off the antenna and from sliding down the antenna to a visibly less desirable position.

In operation, a garment is placed upon one half of the antenna clamp 10 and an automobile antenna 15 of an automobile 17 is placed in the hinge recurve area 14 with the antenna ball 19 protruding and centered in the space between the end of the hinge/strap 14 and the underside of the cap 24. The two halves 12a, 12b are snapped together by the connection means, the antenna 15 is captured inside the diameter of the closed hinge 14 and a garment or flag cloth is captured by the piercing barbs 20 which protrude through the cloth and into the second aperture 22 of the securing means. The preferred dimensions stated above and the above described configuration of the antenna clamp 10 are both aesthetically pleasing to the eye and provides a safe manner of displaying the garment on the automobile. By having the antenna clamp 10 located at the top of the antenna, no visual obstructions are created on the automobile which would constitute a safety hazard.

An alternative embodiment of the present invention allows for the antenna clamp 10 to be attached to an elongated shaft 32 having a zip clamp 36 located at its distal end. The zip clamp 36 generally has a C-shaped configuration wherein a first distal end is provided with a toothed strip extending therefrom and a second distal end is provided with an opening for receiving the toothed strip. The zip clamp 36 can be attached to the front handle bar of a bicycle or like vehicle by stretching open the zip clamp 36 and positioning over and around the bar. Thereafter, the toothed strip is passed through the opening of the second distal end and tightened closed. The elongated shaft 32 is made of flexible plastic material which can easily collapse if impacted. The use of the flexible shaft prevents sharp protruding edges from being exposed to a user thereby providing a greater safety factor.

SUMMARY OF THE ACHIEVEMENT OF THE OBJECTS OF THE INVENTION

From the foregoing, it is readily apparent that I have invented an improved apparatus for supporting a flag or banner on the antenna of an automobile or other transportation vehicle.

Further, it is apparent that I have invented an improved apparatus for supporting a flag or banner on the antenna of an automobile or other transportation vehicle which does not introduce safety hazards and which prominently displays the flag in a high visible position when the automobile is parked or driven.

Still further, it is apparent that I have invented an improved apparatus for supporting a flag or banner on the antenna of an automobile or other transportation vehicle which is easily removed and replaced.

Still further, it is apparent that I have invented an improved apparatus for supporting a flag or banner on an antenna which maintains its position at the top of the antenna while providing rotational capabilities of the antenna clamp.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A garment clamping device for automobile antennas comprising:
    a first half having a generally rectangular configuration;
    a second half having a substantially similar configuration as the first half;

a hinge intermediate the first and second halves, wherein the hinge is flexible and may be manipulated into a closed position thereby defining a generally circular cavity;

an antenna connection means for securing the clamping device in the closed position around the automobile antenna;

a garment securing means for securing the garment within the first half and second half of the clamping device; and wherein the device is of a unitary construction, wherein the connection means is comprised of at least one projecting stud located on either the first or second half and at least one first aperture located in a corresponding position on the opposing half, and wherein the securing means comprises a barb for piercing the garment on the half opposing the projecting stud and a second aperture on the half with the projecting stud, said second aperture being located and adapted in a corresponding position for matingly receiving said barb, wherein the second aperture is a through hole.

2. The garment clamping device of claim 1 wherein said barbs comprise a conical shape.

3. The garment clamping device of claim 1 wherein said projecting stud comprises a cylindrical shape and has a snap ring located at its distal end for added security after snap engagement with the first aperture.

4. The garment clamping device according to claim 1 further comprising a cap extending from the first half.

5. The garment clamping device of claim 1 wherein said first aperture for receiving said projecting stud comprises a tapered entry point and elevated rim portion at its exit.

6. The garment clamping device of claim 1 wherein said device is manufactured by injection molding an elastomeric material.

7. The garment clamping device of claim 6 wherein the elastomeric material is selected from a group consisting of polypropylene, polyethylene, or polyvinyl chloride.

8. A garment clamping device for use with an automobile antenna comprising:

a unitary body having a first and second half;

a flexible hinge strap connected intermediate the first and second halves;

a cap extending from the second half of the body; and wherein the garment is placed on one of the first and second halves and the body is closed around the antenna and held in place within the first and second halves by connection means so that the garment is retained in a fixed position;

wherein in the closed position the body of the clamping device is located immediately beneath an enlargement at an upper end of the antenna for minimizing the chance of inadvertently lifting off the shaft of the antenna and the cap is located atop the enlargement to prohibit the clamping device from sliding down the shaft of the antenna;

wherein the connection means comprises:

at least one projecting stud extending from either the first or second half;

at least one mating aperture in a corresponding position to the projecting stud located on the half opposing the projecting stud for snap engagement;

at least one barb located on either half; and at least one corresponding aperture for receiving the barb located on the opposing half, wherein the corresponding aperture is a through hole.

9. The garment clamping device according to claim 8 wherein said at least one barb has a conical shape.

10. The garment clamping device according to claim 8 wherein the projecting stud is cylindrical and further comprises a snap ring located at its distal end.

11. The garment clamping device of claim 8 wherein said device is comprised of an elastomeric material.

12. The garment clamping device of claim 11 wherein the elastomeric material is selected from a group consisting of polypropylene, polyethylene, or polyvinyl chloride.

13. The garment clamping device according to claim 8 wherein the device is manufactured by injection molding.

14. The garment clamping device according to claim 8 wherein the aperture for receiving the projecting stud is tapered at the entrance and is provided with a rim at its exit.

* * * * *